US006172027B1

(12) United States Patent
Boeckh et al.

(10) Patent No.: US 6,172,027 B1
(45) Date of Patent: Jan. 9, 2001

(54) USE OF WATER-SOLUBLE COPOLYMERS COMPRISING N-VINYLIMIDAZOLE UNITS AS COLOR TRANSFER INHIBITORS IN DETERGENTS

(75) Inventors: Dieter Boeckh, Limburgerhof; Stefan Stein, Saulheim; Angelika Funhoff, Mannheim; Jürgen Alfred Lux, Niederkirchen; Hans-Ulrich Jäger, Neustadt, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/147,295

(22) PCT Filed: May 26, 1997

(86) PCT No.: PCT/EP97/02680

§ 371 Date: Nov. 23, 1998

§ 102(e) Date: Nov. 23, 1998

(87) PCT Pub. No.: WO97/45517

PCT Pub. Date: Dec. 4, 1997

(30) Foreign Application Priority Data

May 29, 1996 (DE) .............................. 196 21 509

(51) Int. Cl.$^7$ ..................................................... C11D 3/37
(52) U.S. Cl. ..................... 510/360; 510/299; 510/361; 510/475; 510/476
(58) Field of Search .................... 510/299, 360, 510/361, 475, 476

(56) References Cited

U.S. PATENT DOCUMENTS 5,126,069 * 6/1992 Kud et al. ................... 252/174.23
5,627,151 * 5/1997 Detering et al. .................. 510/475
5,710,118 * 1/1998 Busch et al. ...................... 510/360
5,710,119 * 1/1998 Busch et al. ...................... 510/360

FOREIGN PATENT DOCUMENTS

| 2 814 287 A1 | 10/1979 | (DE) . |
| 2814287 * | 10/1979 | (DE) .............................. C11D/3/28 |
| 4 235 798 | 4/1994 | (DE) . |
| 4235798 * | 4/1994 | (DE) .............................. C08F/226/06 |
| 0 635 565 A1 | 1/1995 | (EP) . |
| 0 635 566 | 1/1995 | (EP) . |
| WO 95/03382 * | 2/1995 | (WO) .............................. C11D/1/29 |
| WO 9 723 592 | 7/1997 | (WO) . |

* cited by examiner

Primary Examiner—Yogendra Gupta
Assistant Examiner—Christine Ingersoll
(74) Attorney, Agent, or Firm—Oblon, Spivak, McClelland, Maier & Neustadt, P.C.

(57) ABSTRACT

The use of water-soluble copolymers which comprise (a) 5–20 mol % of N-vinylimidazole or 4-vinylpyridine N-oxide units, (b) 95–50 mol % of N-vinylpyrrolidone, N-vinyloxazolidone, methyl-N-vinylimidazole units or mixtures thereof and (c) 0–30 mol % of other monoethylenically unsaturated monomer units, and have an average molecular weight $M_w$ of more than 50,000 as color transfer inhibitors in detergents.

8 Claims, No Drawings

USE OF WATER-SOLUBLE COPOLYMERS COMPRISING N-VINYLIMIDAZOLE UNITS AS COLOR TRANSFER INHIBITORS IN DETERGENTS

The invention relates to the use of water-soluble copolymers based on N-vinylimidazole and N-vinylpyrrolidone as color transfer inhibitors in detergents.

DE-A 2 814 287 discloses detergents which contain 0.1–10% by weight of a water-soluble or -dispersible homo- or copolymer of N-vinylimidazole as discoloration-inhibiting additive. The copolymers contain at least 25 mol % of N-vinylimidazole units.

EP-A 0 635 565 discloses detergent formulations which contain copolymers of N-vinylimidazole and N-vinylpyrrolidone with an average molecular weight of 5000 to 50,000. The minimum N-vinylimidazole content in the copolymers is 20 mol %. According to EP-A 0 635 566, the abovementioned copolymers are used as color transfer inhibitors in detergents whose surfactant system is free of alkylbenzenesulfonates. The detergents may contain cellulases or peroxidases as enzyme where appropriate.

The known low molecular weight color transfer inhibitors with vinylimidazole contents above 20% show, in the laundering of colored textiles, besides the required effect of color transfer inhibition also an upsetting color-releasing effect. In addition, large contents of anionic surfactants and of polycarboxylates in detergents adversely affect the efficacy of the known color transfer inhibitors.

It is an object of the present invention to provide color transfer inhibitors for use in detergents, which in the laundering of colored textiles have less of a color-releasing effect on the colored textiles than do known color transfer inhibitors, and whose efficacy is not reduced by anionic surfactants and polycarboxylates to the extent found with known color transfer inhibitors.

We have found that this object is achieved by the use of water-soluble copolymers which comprise (a) 5–20 mol % of N-vinylimidazole or 4-vinylpyridine N-oxide units, (b) 95–50 mol % of N-vinylpyrrolidone, N-vinyloxazolidone, methyl-N-vinylimidazole units or mixtures thereof and (c) 0–30 mol % of other monoethylenically unsaturated monomer units, where the total of (a), (b) and (c) in mol % is always 100, and which have an average molecular weight $M_w$ of more than 50,000, as color transfer inhibitors in detergents.

Suitable copolymers are, with the exception of the polymers comprising 4-vinylpyridine N-oxide, prepared by copolymerizing the monomers on which these copolymers are based. Processes of this type are known, cf., for example, WO-A 94/26796. Copolymers of 4-vinylpyridine N-oxide can be obtained by copolymerizing 4-vinylpyridine with the group (b) and (c) monomers and subsequently oxidizing the vinylpyridine units to vinylpyridine N-oxide units. Polymers comprising vinylpyridine N-oxide units are described as color transfer inhibitors in detergents, for example in WO-A 94/2578.

The content of N-vinylimidazole or 4-vinylpyridine N-oxide units in the copolymers is 5–20, preferably 5–17.5, mol %. Copolymers comprising 8–15% mol % of N-vinylimidazole units are particularly preferred.

The copolymers comprise as component (b) 95–50 mol % of N-vinylpyrrolidone, N-vinyloxazolidone, methyl-N-vinylimidazole or mixtures of said compounds as copolymerized units. Both 2-methyl-N-vinylimidazole and 4-methyl-N-vinylimidazole units or mixtures thereof can be present in the copolymers. The copolymers comprise 95–50, preferably 62.5–95, mol % of at least one compound of component (b) as copolymerized units. Copolymers which comprise (a) 8–15 mol % of N-vinylimidazole units and (b) 85–92 mol % of N-vinylpyrrolidone units, where the total of (a) and (b) in mol % is always 100, are particularly preferred.

The copolymers may comprise where appropriate up to 30 mol % of other monoethylenically unsaturated monomer units, with the total of (a), (b) and (c) in mol % always being 100.

The group (c) monomers are employed to modify the copolymers of components (a) and (b). Examples of suitable group (c) monomers are vinyl esters of saturated carboxylic acids, eg. vinyl formate, vinyl acetate, vinyl propionate or vinyl butyrate, esters of acrylic acid and methacrylic acid derived, in each case, from alcohols having 1 to 8 carbon atoms, in particular methyl acrylate, ethyl acrylate, isopropyl acrylate, n-propyl acrylate, methyl methacrylate and ethyl methacrylate, acrylonitrile, methacrylonitrile, acrylamide and methacrylamide. Esters of other monoethylenically unsaturated carboxylic acids are also suitable as group (c) monomers, for example dimethyl maleate.

The average molecular weight $M_w$ of the water-soluble copolymers is more than 50,000, for example 55,000 to 2 million. Copolymers with an average molecular weight $M_w$ of 75,000 to 500,000 are preferably employed according to the invention. The copolymers which are preferably employed comprise (a) 5–17.5 mol % of N-vinylimidazole or 4-vinylpyridine N-oxide units, (b) 62.5–95 mol % of N-vinylpyrrolidone, N-vinyloxazolidone, methyl-N-vinylimidazole units or mixtures thereof and (c) 0–20 mol % of other monoethylenically unsaturated monomer units, where the total of (a), (b) and (c) is always 100. The copolymers described above are present in detergent formulations in amounts of 0.05–5.0, preferably 0.1–2.0, % by weight. In the laundering of colored textiles they act as color transfer inhibitors in the wash liquor. They are employed both in heavy duty detergents and in color detergents. The copolymers to be used according to the invention are usually present in color-sparing color detergents in amounts of 0.1–1.5, preferably 0.2–1.0, % by weight.

The detergents comprising the copolymers to be used according to the invention may be in powder form or else in a liquid formulation. They contain the anionic and/or nonionic surfactants which are conventionally used in amounts of 2–50, preferably 8–30, % by weight. Phosphate-free or reduced phosphate detergents are particularly preferably produced having a phosphate content not exceeding 25%, calculated as pentasodium triphosphate. The detergents may also be in the form of granules or as compact detergents having a density of 500–950 g/l.

The detergents may be heavy duty detergents or specialty detergents. Suitable surfactants are both anionic and nonionic or mixtures of anionic and nonionic surfactants. The surfactant content of the detergents is preferably 8–30% by weight.

Examples of suitable anionic surfactants are fatty alcohol sulfates from fatty alcohols having 8–22, preferably 10–18, carbon atoms, eg. $C_9$–$C_{11}$-alcohol sulfates, $C_{12}$–$C_{13}$-alcohol sulfates, cetyl sulfate, myristyl sulfate, palmityl sulfate, stearyl sulfate and tallow fatty alcohol sulfate.

Other suitable anionic surfactants are sulfated, ethoxylated $C_8$–$C_{22}$-alcohols or soluble salts thereof. Compounds of this type are prepared, for example, by initially alkoxylating a $C_8$–$C_{22}$-, preferably a $C_{10-18}$-, alcohol and subsequently sulfating the alkoxylation product. Ethylene oxide is preferably used for the alkoxylation, in which case 2–50, preferably 3–20, mol of ethylene oxide are employed per mole of fatty alcohol. However, the alcohols can also be alkoxylated with propylene oxide, alone or with butylene oxide. Also suitable are alkoxylated $C_8$–$C_{22}$-alcohols comprising ethylene oxide and propylene oxide or ethylene oxide and butylene oxide. The alkoxylated $C_8$–$C_{22}$-alcohols may contain the ethylene oxide, propylene oxide and butylene oxide units in the form of blocks or in random distribution.

Other suitable anionic surfactants are alkylsulfonates such as $C_8$–$C_{24}$-, preferably $C_{10}$–$C_{18}$-, alkanesulfonates, and soaps such as the salts of $C_8$–$C_{24}$-carboxylic acids.

Other suitable anionic surfactants are linear $C_9$–$C_{20}$-alkylbenzene-sulfonates (LAS). The polymers according to the invention are preferably employed in detergent formulations containing less than 4% of LAS, particularly preferably in LAS-free formulations.

The anionic surfactants are preferably added in the form of salts to the detergent. Suitable cations in the salts are alkali metal ions such as sodium, potassium and lithium ions, and ammonium ions such as hydroxyethylammonium, di(hydroxyethyl)ammonium and tri(hydroxyethyl)ammonium ions.

Examples of suitable nonionic surfactants are alkoxylated $C_8$–$C_{22}$-alcohols. The alkoxylation can be carried out with ethylene oxide, propylene oxide and/or butylene oxide. It is possible to employ as surfactant in this connection all alkoxylated alcohols containing at least two molecules of one of the abovementioned alkylene oxides in the adduct. Also suitable in this connection are block copolymers of ethylene oxide, propylene oxide and/or butylene oxide, or adducts which contain said alkylene oxides in random distribution. 2–5, preferably 3–20, mol of at least one alkylene oxide are used per mole of alcohol. Ethylene oxide is preferably employed as alkylene oxide. The alcohols preferably have 10–18 carbon atoms.

Another class of nonionic surfactants comprises alkyl polyglucosides having 8–22, preferably 10–18, carbon atoms in the alkyl chain. These compounds contain 1–20, preferably 1.1–5, glucoside units.

Another class of nonionic surfactants comprises N-alkylglucamides of the general structure II or III

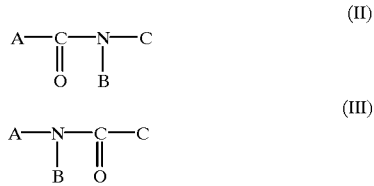

where A is $C_6$–$C_{22}$-alkyl, B is H or $C_1$–$C_4$-alkyl and C is a polyhydroxyalkyl radical having 5–12 carbon atoms and at least three hydroxyl groups. A is preferably $C_{10}$–$C_{18}$-alkyl, B is preferably $CH_3$ and C is preferably a $C_5$ or $C_6$ radical. Compounds of this type are obtained, for example, by acylation of reductively aminated sugars with chlorides of $C_{10}$–$C_{18}$-carboxylic acids. The detergent formulations preferably contain $C_{10}$–$C_{16}$-alcohols ethoxylated with 3–12 mol of ethylene oxide, particularly preferably ethoxylated fatty alcohols, as nonionic surfactants.

The detergents in powder or granule form and, where appropriate, structured liquid detergents additionally contain one or more inorganic builders. Suitable inorganic builder substances are all conventional inorganic builders such as alumosilicates, silicates, carbonates and phosphates.

Examples of suitable inorganic builders are alumosilicates with ion-exchanging properties such as zeolites. Various types of zeolites are suitable, in particular zeolites A, X, B, P, MAP and HS in their Na form or in forms in which Na is partly replaced by other cations such as Li, K, Ca, Mg or ammonium. Suitable zeolites are described, for example, in EP-A 0 038 591, EP-A 0 021 491, EP-A 0 087 035, U.S. Pat. No. 4,604,224, GB-A 2 013 259, EP-A 0 522 726, EP-A 0 384 070A and WO-A 94/24251.

Examples of other suitable inorganic builders are amorphous or crystalline silicates such as amorphous disilicates, crystalline disilicates such as the sheet silicate SKS-6 (manufactured by Hoechst AG). The silicates can be employed in the form of their alkali metal, alkaline earth metal or ammonium salts. Na, Li and Mg silicates are preferably employed.

Other suitable inorganic builder substances are carbonates and bicarbonates. These can be employed in the form of their alkali metal, alkaline earth metal or ammonium salts. Preferably employed are Na, Li and Mg carbonates or bicarbonates, in particular sodium carbonate and/or sodium bicarbonate.

The inorganic builders can be present in the detergents in amounts of 5–60% by weight together with the organic cobuilders. The inorganic builders can be incorporated either alone or in any combination with one another into the detergent. They are added to detergents in powder or granule form in amounts of 10–60% by weight, preferably of 20–50% by weight. Inorganic builders are employed in structured (multiphase) liquid detergents in amounts of up to 40% by weight, preferably up to 20% by weight. They are suspended in the liquid formulation ingredients.

The detergents contain in addition one or more organic cobuilders. These comprise low molecular weight polymeric polycarboxylates.

Examples of suitable polymeric polycarboxylates are (1) Polymaleic acids obtainable by polymerizing maleic anhydride in aromatic hydrocarbons in the presence of free-radical initiators and subsequently hydrolyzing the anhydride groups in the polymer, cf., for example, EP-A 0 451 508 and EP-A 0 396 303. The molecular weight of the polymaleic acids is preferably 800–5000.

(2) Copolymers of unsaturated $C_4$–$C_8$-dicarboxylic acids, suitable comonomers being i) Monoethylenically unsaturated $C_3$–$C_8$-monocarboxylic acids such as acrylic acid, methacrylic acid, crotonic acid and vinylacetic acid, preferably acrylic acid and methacrylic acid, ii) $C_2$–$C_{22}$-monoolefins, vinyl alkyl ethers with $C_1$–$C_8$-alkyl groups, styrene, vinyl esters of $C_1$–$C_8$-carboxylic acids, (meth)acrylamide and vinylpyrrolidone, preferably $C_2$–$C_6$-α-olefins, vinyl alkyl ethers with $C_1$–$C_4$-alkyl groups, vinyl acetate and vinyl propionate, hydroxyalkyl acrylates such as hydroxyethyl acrylate, hydroxy-n-propyl acrylate, hydroxybutyl acrylate, hydroxyisobutyl acrylate, hydroxyethyl methacrylate, hydroxypropyl methacrylate or hydroxyisopropyl acrylate, iii) (meth)acrylic esters of monohydric $C_1$–$C_8$-alcohols, (meth)acrylonitrile, (meth)acrylamides of $C_1$–$C_8$-amines, N-vinylformamide and N-vinylimidazole.

Examples of suitable unsaturated $C_4$–$C_8$-dicarboxylic acids are maleic acid, fumaric acid, itaconic acid and citraconic acid. Maleic acid is preferred. The copolymers may contain the monomer units of group i) in amounts of up to 95%, ii) in amounts of up to 60% and iii) in amounts of up to 20%.

The copolymers may contain units of 2, 3, 4 or even 5 different monomers.

If the group ii) polymers contain vinyl ester units, these can also be partly or completely hydrolyzed to vinyl alcohol units. Suitable co- and terpolymers are disclosed, for example, in U.S. Pat. No. 3,887,806 and DE-A 4 313 909.

Suitable and preferred copolymers of dicarboxylic acids are

Copolymers of maleic acid and acrylic acid in the ratio 10:90 to 95:5 by weight, particularly preferably those in the ratio 30:70 to 90:10 by weight, with molecular weights of, preferably, up to 10,000. Copolymers with molecular weights $M_w$ of 1000–6000 are particularly preferred.

Terpolymers of maleic acid, acrylic acid and a vinyl ester of a $C_1$–$C_3$-carboxylic acid in the ratio 10 (maleic acid):90 (acrylic acid+vinyl ester) to 95 (maleic acid):10 (acrylic acid+vinyl ester) by weight, it being possible for the ratio of acrylic acid to vinyl ester to vary in the range from 20:80 to 80:20 by weight and, particularly preferably, Terpolymers of maleic acid, acrylic acid and vinyl formate, vinyl acetate or vinyl propionate in the ratio 20 (maleic acid):80 (acrylic acid+vinyl ester) to 90 (maleic acid):10 (acrylic acid+vinyl ester) by weight, it being possible for the ratio of acrylic acid to vinyl ester to vary in the range from 30:70 to 70:30 by weight. The molecular weights $M_w$ of the terpolymers are preferably up to 10,000, in particular 1000–7000.

Copolymers of maleic acid with $C_2$–$C_8$-α-olefins in the molar ratio 40:60 to 80:20, with copolymers of maleic acid and ethylene, propylene, isobutene or diisobutene in the molar ratio 50:50 being particularly preferred. The molecular weights $M_w$ of these polymers are preferably in the range from 1000 to 7000.

(3) Graft copolymers of unsaturated carboxylic acids on low molecular weight carbohydrates or hydrogenated carbohydrates, cf. U.S. Pat. No. 5,227,446, DE-A 4 415 623 and DE-A 4 313 909.

Examples of suitable unsaturated carboxylic acids are maleic acid, fumaric acid, itaconic acid, citraconic acid, acrylic acid, methacrylic acid, crotonic acid and vinylacetic acid, and mixtures of acrylic acid and maleic acid, which are grafted on, for example, in amounts of 40–95% by weight based on the component to be grafted. It is also possible for up to 30% by weight, based on the component to be grafted, of other monoethylenically unsaturated monomer units to be present for the modification. Suitable modifying monomers are the above-mentioned monomers of groups ii) and iii), and acrylamido-2-methylpropanesulfonic acid or sodium vinylsulfonate.

Suitable as grafting base are degraded polysaccharides such as acidically or enzymatically degraded starches, inulins or cellulose, reduced (hydrogenated or reductively aminated) degraded polysaccharides such as mannitol, sorbitol, aminosorbitol and glucamine, and sugars, eg. glucose, and polyalkylene glycols with molecular weights of up to $M_w$=5000 such as polyethylene glycols, ethylene oxide/propylene oxide or ethylene oxide/butylene oxide block copolymers, random ethylene oxide/propylene oxide or ethylene oxide/butylene oxide copolymers, alkoxylated mono- or polyhydric $C_1$–$C_{22}$-alcohols, cf. U.S. Pat. No. 4,746,456.

Preferably employed from this group are grafted degraded or degraded reduced starches and grafted polyethylene oxides, employing 20–80% by weight of monomers based on the grafting component in the graft copolymerization. A mixture of maleic acid and acrylic acid in the ratio from 90:10 to 10:90 is preferably employed for grafting. The molecular weights $M_w$ of the graft copolymers are preferably up to 10,000 and, in particular, 1000–7000.

(4) Polyglyoxylic acid, cf., for example, EP-B 0 001 004, U.S. Pat. No. 5,399,286, DE-A 4 106 355 and EP-A 0 656 914. The end groups of the polyglyoxylic acids may have different structures. The polymers preferably have molecular weights $M_w$ of up to 10,000, in particular 1000–7000.

(5) Polyamidocarboxylic acids and modified polyamidocarboxylic acids, cf., for example, EP-A 0 454 126, EP-B 0 511 037, WO-A 94/01486 and EP-A 0 581 452.

Preferably used are polyaspartic acid or cocondensates of aspartic acid with other amino acids, $C_4$–$C_{25}$-mono- or dicarboxylic acids, $C_4$–$C_{25}$-mono- or diamines. Polyaspartic acids which have been prepared in phosphorus-containing acids and have been modified with $C_6$–$C_{22}$-mono- or dicarboxylic acids or with $C_6$–$C_{22}$-mono- or diamines are particularly preferably employed. Particularly preferred modified polyaspartic acids are those obtainable by condensing aspartic acid with 5–25 mol %, based on aspartic acid, of tridecylamine or oleylamine and at least 5% by weight, based on aspartic acid, of phosphoric acid or phosphorous acid at from 150 to 230° C., and hydrolyzing and neutralizing the cocondensates. The molecular weights $M_w$ of the polycondensates are preferably up to 10,000 and, in particular, 1000–7000.

(6) Condensates of citric acid with hydroxy carboxylic acids or polyhydroxy compounds, cf., for example, WO-A 93/22362 and WO-A 92/16493. Condensates of this type containing carboxyl groups have molecular weights $M_w$ of up to 10,000, preferably of up to 5000.

The organic cobuilders are present in the detergent formulations in powder or granule form and in the structured liquid formulations in amounts of 0.5–15% by weight, preferably of 1–8% by weight, together with inorganic builders. Liquid detergent formulations contain organic cobuilders in amounts of 0.5–20% by weight, preferably of 1–10% by weight, particularly preferably of 1.5–7.5% by weight.

The heavy duty detergents in powder or granule form additionally comprise a bleach system consisting of at least one bleach, possibly combined with a bleach activator and/or a bleach catalyst.

Suitable bleaches are perborates and percarbonates in the form of their alkali metal, in particular their Na salts. They are present in the formulations in amounts of 5–30% by weight, preferably 10–25% by weight. Other suitable bleaches are inorganic and organic peracids in the form of their alkali metal or magnesium salts or partly also in the form of the free acids. Examples of suitable organic peracids and salts thereof are Mg monoperphthalate, phthalimidopercaproic acid and diperdodecanedioic acid. An example of an inorganic peracid salt is potassium peroxomonosulfate (Oxon).

Examples of suitable bleach activators are acylamines such as tetracetylethylenediamine, tetraacetylglycoluril, N,N'-diacetyl-N,N'-dimethylurea and 1,5-diacetyl-2,4-dioxohexahydro-1,3,5-triazine acylated lactams such as acetylcaprolactam, octanoylcaprolactam and benzoylcaprolactam substituted phenol esters of carboxylic acids such as Na acetoxybenzenesulfonate, Na octanoyloxybenzenesulfonate and Na nonanoyloxybenzenesulfonate acylated sugars such as pentaacetylglucose anthranil derivatives such as 2-methylanthranil and 2-phenylanthranil enol esters such as isopropenyl acetate oxime esters such as acetone O-acetyloxime carboxylic anhydrides such as phthalic anhydride or acetic anhydride.

Tetraacetylethylenediamine and Na nonanoyloxybenzenesulfonates are preferably employed as bleach activators.

The bleach activators are added to heavy duty detergents in amounts of 0.1–15% by weight, preferably of 1.0–8.0% by weight, particularly preferably of 1.5–6.0% by weight.

Suitable bleach catalysts are quaternized imines and sulfone imines as describd in U.S. Pat. No. 5,360,568, U.S. Pat. No. 5,360,569 and EP-A 0 453 003, and Mn complexes, cf., for example, WO-A 94/21777. If bleach catalysts are employed in the detergent formulations, they are present therein in amounts of up to 1.5% by weight, preferably up to 0.5% by weight, and in the case of the very active manganese complexes in amounts of up to 0.1% by weight.

The detergents preferably contain an enzyme system. This comprises the proteases, lipases, amylases and cellulases conventionally employed in detergents. The enzyme system may be restricted to a single enzyme or comprise a combination of different enzymes. Commercial enzymes are, as a rule, added to the detergents in amounts of 0.1–1.5% by weight, preferably 0.2–1.0% by weight, of the formulated enzyme. Examples of suitable proteases are Savinase and Esperase (manufactured by Novo Nordisk). An example of a suitable lipase is Lipolase (manufactured by Novo Nordisk). An example of a suitable cellulose is Celluzym (manufactured by Novo Nordisk).

The detergents additionally preferably contain soil-release polymers and/or antiredeposition agents. These comprise, for example, Polyesters from polyethylene oxides with ethylene glycol and/or propylene glycol and aromatic dicarboxylic acids or aromatic and aliphatic dicarboxylic acids. Polyesters from polyethylene oxides, which are end group-capped at one end, with dihydric and/or polyhydric alcohols and dicarboxylic acids. Polyesters of these types are known, cf., for example, U.S. Pat. No. 3,557,039, GB-A 1 154 730, EP-A 0 185 427, EP-A 0 241 984, EP-A 0 241 985, EP-A 0 272 033 and U.S. Pat. No. 5,142,020.

Other suitable soil-release polymers are amphiphilic graft or other copolymers of vinyl and/or acrylic esters on polyalkylene oxides, cf. U.S. Pat. No. 4,746,456, U.S. Pat. No. 4,846,995, DE-A 3 711 299, U.S. Pat. No. 4,904,408, U.S. Pat. No. 4,846,994 and U.S. Pat. No. 4,849,126 or modified celluloses such as methylcellulose, hydroxypropylcellulose or carboxymethylcellulose.

Antiredeposition agents and soil-release polymers are present in the detergent formulations in amounts of 0–2.5% by weight, preferably 0.2–1.5% by weight, particularly preferably 0.3–1.2% by weight. Soil-release polymers which are preferably employed are the graft copolymers of vinyl acetate on polyethylene oxide of molecular weight 2500–8000 in the ratio 1.2:1 to 3.0:1 by weight, which are disclosed in U.S. Pat. No. 4,746,456, and commercial polyethylene terephthalate/polyoxyethylene terephthalates of molecular weight 3000–25,000 from polyethylene oxides of molecular weight 750–5000 with terephthalic acid and ethylene oxide and a molar ratio of polyethylene terephthalate to polyoxyethylene terephthalate of 8:1 to 1:1, and the block polycondensates which are disclosed in DE-A 4 403 866 and which contain blocks of (a) ester units from polyalkylene glycols with a molecular weight of 500–7500 and aliphatic dicarboxylic acids and/or monohydroxymonocarboxylic acids and (b) ester units from aromatic dicarboxylic acids and polyhydric alcohols. These amphiphilic block copolymers have molecular weights of 1500–25,000.

The copolymers to be used according to the invention as color transfer inhibitors in detergents are preferably employed in detergents whose surfactant system is free of alkylbenzenesulfonates. In contrast to the copolymers of N-vinylimidazole and N-vinylpyrrolidone which are disclosed in EP-A 635 565 and have a content of N-vinylimidazole units of at least 20%, the effect of enzymes, especially proteases and cellulases, in detergents which contain the copolymers to be used according to the invention is surprisingly improved. The copolymers to be used according to the invention are therefore advantageously employed in detergents which contain enzymes. The copolymers to be used according to the invention surprisingly have, despite the low contents of vinylimidazole or 4-vinylpyridine N-oxide units, a very good color transfer inhibiting effect which distinctly exceeds that of homopolymers of vinylpyrrolidone or vinyloxazolidone. It was furthermore not predictable that high contents of anionic surfactants and polycarboxylates in detergents do not impair the efficacy of the copolymers to be used according to the invention, or do not impair it as greatly, as the efficacy of the known copolymers of vinylimidazole and vinylpyrrolidone. Another surprising advantage of the copolymers to be used according to the invention is that they have less of a color-releasing effect than do the known copolymers of N-vinylimidazole and N-vinylpyrrolidone with a higher content of N-vinylimidazole, in particular those with molecular weights below 50,000.

The molecular weights $M_w$ were determined by light scattering. The percentage data in the examples mean % by weight unless otherwise evident from the context.

Preparation of the Polymers

Polymer 1

360 g of N-vinylpyrrolidone (VP) and 40 g of N-vinylimidazole (VI) are dissolved in 930 g of water. Nitrogen is passed through this mixture in order substantially to free it of oxygen, and it is heated to 85° C. under a nitrogen atmosphere. To this mixture is added over the course of 2 hours a solution of 8 g of 2,2'-azobis(2-methylbutyronitrile) in 50 ml of i-propanol. In parallel over the same period a 4% by weight aqueous solution of 2-mercaptoethanol is added dropwise. The mixture is then stirred at 85° C. for 1 hour. After this, the temperature is reduced to 60° C. and, at the same time, 4 g of a 70% by weight aqueous solution of t-butyl hydroperoxide and a solution of 2.8 g of sodium bisulfite in 50 g of water are added. The mixture is then stirred at 60° C. for a further hour. It is finally deodorized by steam distillation. Freeze drying results in 395.7 g of a colorless powder. The average molecular weight Mw of the copolymer is 84,000.

Polymer 2

340 g of N-vinylpyrrolidone and 60 g of N-vinylimidazole are dissolved in 930 g of water. Nitrogen is passed through this mixture in order substantially to free it of oxygen, and it is heated to 85° C. under a nitrogen atmosphere. To this mixture is added over the course of 2 hours a solution of 2 g of 2,2'-azobis(2-methylbutyronitrile) in 50 ml of i-propanol. The mixture is then stirred at 85° C. for 1 hour. After this, the temperature is reduced to 60° C. and, at the same time, 4 g of a 70% by weight aqueous solution of t-butyl hydroperoxide and a solution of 2.8 g of sodium bisulfite in 50 g of water are added. The mixture is then stirred at 60° C. for a further hour. It is finally deodorized by steam distillation. Freeze drying results in 392.5 g of a colorless powder. The average molecular weight $M_w$ of the copolymer is 900,000.

Polymer 3

3600 g of water and 30 g of vinylpyrrolidone were introduced into a flask with a capacity of 4 l which was equipped with a stirrer, reflux condenser and thermometer. Nitrogen is passed through this mixture to remove oxygen. It is heated to 73° C. and, over the course of 3 hours, two separate feeds are added to the stirred reaction mixture.

Feed 1 consists of 24 g of N-vinylimidazole (VI) and 486 g N-vinylpyrrolidone (VP). Feed 2 is a solution of 2 g of 2,2'-azobis(2-amidinopropane) dihydrochloride in 25 g of water. After the additions are complete, polymerization is continued for 2 hours.

Finally, steam distillation is carried out. Freeze drying results in 539 g of a colorless powder. The average molecular weight $M_w$ of the copolymer is 1.5 million.

Polymer 4 (prior art comparison)

Copolymer of N-vinylimidazole and N-vinylpyrrolidone (ratio 1:1 by weight) of molecular weight 15,000

150 g of water are added to a mixture of 30 g of vinylimidazole and 30 g of vinylpyrrolidone monomers. Under a nitrogen atmosphere, the mixture is heated to 85° C. with stirring. Then, at the same time, a 5% by weight solution of 1 g of 2,2'-azobis(2-methylbutyronitrile) in i-propanol, and 2.2 g of 2-mercaptoethanol dissolved in 50 g of water are added dropwise. After the addition is complete, the mixture is stirred at 85° C. for 2 hours.

The temperature is then reduced to 60° C. and, at the same time, 0.6 g of a 70% by weight aqueous solution of t-butyl hydroperoxide and a solution of 0.4 g of sodium bisulfite in 8 g of water are added. The mixture is then stirred at 60° C. for a further hour. It is finally deodorized by steam distillation. Freeze drying results in 58.6 g of a colorless powder.

Polymer 5 (prior art comparison)

Polyvinylpyrrolidone homopolymer of molecular weight 40,000.

The copolymers to be used according to the invention are employed as additive to the heavy duty detergents indicated in Table 1.

TABLE 1

|  | I | II | III | IV | V | VI | VII |
|---|---|---|---|---|---|---|---|
| Polymer 1 | 1.5 |  | 1.0 | 0.5 |  |  |  |
| Polymer 2 |  | 1.0 |  |  |  | 0.6 |  |
| Polymer 3 |  |  |  |  | 1.0 |  | 1.0 |
| AA/MA (70,000) | 7.5 |  | 5.0 |  | 5.0 |  |  |
| AA/MA/VAc terpolymer (40,000) |  |  |  |  |  | 5.0 |  |
| Oligomaleic acid |  |  |  |  | 5.0 |  |  |
| Polyaspartic acid | 7.5 |  |  |  |  |  | 5.0 |
| Na perborate monohydrate | 15 | 15 |  |  | 15 |  | 7.5 |
| Na percarbonate |  |  | 18 | 15 |  | 18 |  |
| TAED |  | 3.8 |  | 5.0 |  | 4.2 | 2.0 |
| NOBS | 4.0 |  | 5.0 |  | 2.9 |  |  |
| Na lauryl sulfate |  | 6.0 | 12.0 | 6.0 |  |  |  |
| Na linear alkylbenzenesulfonate | 3.1 | 1.7 | 0.8 |  |  | 6.5 |  |
| Sulfated fatty alcohol ethoxylate |  |  |  |  | 5.5 |  |  |
| Soap | 2.8 | 0.6 | 0.4 | 2.5 | 1.5 |  | 2.4 |
| $C_{13}/C_{15}$ oxo alcohol*3 EO |  | 3.0 |  |  |  |  |  |
| $C_{13}/C_{15}$ oxo alcohol*7 EO | 4.7 |  | 4.7 | 13.5 | 4.0 | 6.5 |  |
| $C_{13}/C_{15}$ oxo alcohol*10 EO |  | 3.0 |  |  |  |  |  |
| $C_{12}/C_{14}$ fatty alcohol*7 EO |  |  |  |  |  |  | 10.0 |
| Lauryl alcohol*13 EO |  |  |  |  |  | 5.0 |  |
| Zeolite A | 25 | 25 | 15 |  | 30 | 15 | 35 |
| Zeolite P |  |  |  | 40 |  |  |  |
| SKS-6 |  |  | 14 |  |  | 15 |  |
| Na disilicate | 2.5 | 3.9 |  | 0.5 | 4.5 |  | 1.5 |
| Mg silicate | 1.0 |  | 0.8 |  | 1.0 | 1.0 | 0.6 |
| Sodium sulfate | 20 | 2.5 | 3.2 | 2.0 | 1.5 | 5.5 | 3.4 |
| Sodium bicarbonate |  |  | 9.0 | 6.5 |  |  |  |
| Sodium carbonate | 12.0 | 13.6 |  |  | 10.0 | 8.0 | 9.8 |
| Sokalan ® HP 22 |  | 0.4 |  |  | 0.5 |  |  |
| Polyethylene terephthalate/oxyethylene terephthalate | 1.0 |  |  |  | 0.5 | 0.8 | 1.0 |
| Carboxymethylcellulose | 0.6 | 1.3 | 0.6 | 1.0 | 0.6 | 0.6 | 0.5 |
| Dequest ® 2046 (Phosphonate) |  |  |  | 0.5 |  |  |  |
| Citric acid |  | 6.8 | 5.0 |  |  | 2.5 | 3.8 |
| Lipase |  |  |  |  | 1.0 |  |  |
| Protease |  | 1.0 |  |  | 1.0 | 0.5 | 0.6 |
| Cellulase |  |  |  |  |  |  | 0.6 |
| Water | to 100 | to 100 | to 100 | to 100 | to 100 | to 100 | to 100 |

Abbreviations:
TAED Tetraacetylethylenediamine
NOBS Na nonanoyloxybenzenesulfonate
SKS-6 Sheet silicate Na salt (manufactured by Hoechst)
EO Ethylene oxide
AA/MA (70,000) = Acrylic acid/maleic acid copolymer in the ratio 70:30 by weight, molecular weight $M_w$ = 70,000
AA/MA/VAc (40,000) = Acrylic acid/maleic acid/vinyl acetate terpolymer in the molar ratio 40:10:50 with molecular weight $M_w$ = 40,000
Sokalan ® HP 22 Commercial graft copolymer of vinyl acetate on polyethylene glycol (soil-release polymer)

Table 2 indicates the compositions of color detergents containing the copolymers to be used according to the invention.

TABLE 2

|  | VII | VIII | IX | X | XI | XII |
|---|---|---|---|---|---|---|
| Polymer 1 | 1.0 | 1.0 | 0.5 | 1.0 | 0.5 | 0.5 |
| AA/MA (70,000) | 6.0 | 5.0 | 3.5 |  |  | 8.5 |

TABLE 2-continued

|  | VII | VIII | IX | X | XI | XII |
|---|---|---|---|---|---|---|
| Oligomaleic acid |  |  |  | 4.5 | 7.5 |  |
| Na lauryl sulfate |  | 8.6 | 12.5 |  | 15.5 |  |
| Na linear alkylbenzenesulfonate |  | 1.7 |  |  |  | 7.5 |
| Sulfated fatty alcohol ethoxylate |  |  |  | 7.5 |  |  |
| Soap | 2.8 |  | 3.0 | 1.5 | 1.5 |  |
| $C_{13}/C_{15}$ oxo alcohol*3 EO |  |  |  |  | 1.5 |  |
| $C_{13}/C_{15}$ oxo alcohol*7 EO | 6.7 |  | 6.0 | 13.5 | 4.0 | 7.5 |
| $C_{13}/C_{15}$ oxo alcohol*10 EO |  | 6.3 |  |  |  |  |
| Lauryl alcohol*13 EO |  |  |  | 2.0 |  | 5.0 |
| Zeolite A | 28 | 55 | 35 |  | 37 | 18 |
| Zeolite P |  |  |  | 36 |  |  |
| SKS-6 |  |  | 12 |  |  |  |
| Na disilicate | 4.5 |  |  | 0.5 | 4.5 |  |
| Mg silicate | 1.0 |  | 1.0 |  | 1.0 | 1.0 |
| Sodium sulfate | 24 | 5.8 | 11.5 | 2.0 | 4.5 | 7.5 |
| Sodium bicarbonate |  |  | 6.5 | 6.5 |  |  |
| Sodium carbonate | 12.0 | 6.0 |  |  | 10.0 | 9.0 |
| Carboxymethylcellulose | 0.6 | 0.5 | 0.6 | 1.0 | 0.6 | 0.6 |
| Sokalan ® HP 22 | 1.0 |  |  |  |  | 0.5 |
| Polyethylene terephthalate/ |  |  | 1.0 | 0.5 |  | 0.5 |

TABLE 2-continued

|  | VII | VIII | IX | X | XI | XII |
|---|---|---|---|---|---|---|
| oxyethylene terephthalate |  |  |  |  |  |  |
| Sodium citrate | 2.0 | 9.0 |  |  |  | 2.5 |
| Protease | 0.5 | 1.0 |  |  |  | 1.0 |
| Cellulase | 1.0 |  | 1.0 |  | 0.8 | 1.0 |
| Water | to 100 | to 100 | to 100 | to 100 | to 100 | to 100 |

For abbreviations, see key to Table 1

Use tests

To test the color transfer inhibiting effect, polymers 1–3 were tested as color transfer inhibitors in detergent VIII, comparing with a prior art VI/VP copolymer. The washing conditions are indicated in Table 3, and the results are indicated in Table 4.

White cotton test fabric was washed under the conditions specified in Table 3 with addition of detergent VIII shown in Table 2 in the presence of dye. The dye was added as dilute solution to the wash liquor ready for use.

TABLE 3

Washing conditions (color transfer inhibition)

| Machine | Launder-O-meter |
|---|---|
| Cycles | 1 |
| Duration | 30 min |
| Temperature | 60° C. |
| Water hardness | 3 mmol/l |
| Dye introduced | 2.5 g of dyed fabric |
| Test fabric | 2.5 g of cotton cheesecloth (bleached) |
| Amount of liquor | 250 ml |
| Liquor ratio | 1:50 |
| Detergent | No. VIII from Tab. 2 |
| Detergent concentration | 5.0 g/l |

The coloring of the test fabric was measured by photometry. The reflectance measurements on the individual test fabrics were used to determine the strengths of each of the colorings by the method described in A. Kud, Seifen, Öle, Fette, Wachse 119 (1993) 590–594.

TABLE 4

Color transfer inhibition (numbers are color strength units)

| | Detergent No. | Color transfer inhibitor | Direct black 22 | Direct orange 39 | Direct black 51 | Direct red 212 | Direct blue 71 |
|---|---|---|---|---|---|---|---|
| Example No. | | | | | | | |
| 1 | VIII | Polymer 1 | 11.7 | 45.9 | 65.4 | 8.7 | 6.3 |
| 2 | VIII | Polymer 2 | 10.9 | 42.2 | 65.3 | 8.2 | 6.5 |
| 3 | VIII | Polymer 3 | 11.2 | 44.1 | 62.4 | 7.2 | 6.4 |
| Comparative example No. | | | | | | | |
| 1 | VIII | None | 188 | 173 | 156 | 110 | 145 |
| 2 | VIII | Polymer 4 | 10.5 | 48.2 | 64.8 | 7.3 | 6.5 |
| 3 | VIII | Polymer 5 | 22.5 | 76.6 | 91.7 | 16.0 | 8.3 |

The results with the polymers to be used according to the invention show that the color transfer inhibiting effect of the color transfer inhibitors to be used according to the invention is excellent.

The effect of these polymers is distinctly greater than that of pure polyvinylpyrrolidone (polymer 5, Comparative Example 3) and is comparable with the effect of copolymers with high vinylimidazole contents (polymer 4, Comparative Example 2).

We claim:

1. A detergent, comprising
   at least one surfactant; and
   a water-soluble copolymer as color transfer inhibitor,
   wherein the copolymer comprises:
   (a) 5–16 mol % of N-vinylimidazole or 4-vinylpyridine N-oxide units,
   (b) 95–50 mol % of methyl-N-vinylimidazole units, and
   (c) 0–30 mol % of other monoethylenically unsaturated monomer units derived from a vinyl ester of a saturated carboxylic acid, an ester of acrylic acid and methacrylic acid derived, in each case, from an alcohol having 1 to 8 carbon atoms, acrylonitrile, methacrylonitrile, acrylamide or methacrylamide, wherein the total of (a), (b) and (c) in mol % is 100, and the copolymer has average molecular weight $M_w$ of more than 50,000.

2. A detergent as claimed in claim 1, wherein the copolymer has an average molecular weight $M_w$ of from 55,000 to 2 million.

3. A detergent as claimed in claim 1, wherein the copolymer has an average molecular weight $M_w$ of 75,000 to 500,000.

4. The detergent as claimed in claim 1, wherein the copolymer comprises:

(a) 5–15 mol % of N-vinylimidazole units, (b) 62.5–95 mol % of methyl-N-vinylimidazole units, and (c) 0–20 mol % of other monoethylenically unsaturated monomer units derived from a vinyl ester of a saturated carboxylic acid, an ester of acrylic acid and methacrylic acid derived, in each case, from an alcohol having 1 to 8 carbon atoms, acrylonitrile, methacrylonitrile, acrylamide or methacrylamide, wherein the total of (a), (b) and (c) is 100.

5. A detergent as claimed in claim 1, wherein the surfactant system of the detergent is free of alkylbenzenesulfonates.

6. A detergent as claimed in claim 1, further comprising enzymes.

7. The detergent as claimed in claim 1, wherein said methyl-N-vinylimidazole units are selected from the group consisting of 2-methyl-N-vinylimidazole and 4-methyl-N-vinylimidazole.

8. A detergent, based on surfactants, which further comprises, as color transfer inhibitors a water-soluble copolymer, wherein said copolymer comprises:

(a) 5–15 mol % N-vinylimidazole or 4-vinylpyridine N-oxide units;

(b) 95–62.5 mol % of a mixture consisting of N-vinylpyrrolidone and methyl-N-vinylimidazole; and (c) 0–30 mol % of other monoethylenically unsaturated monomer units derived from vinyl esters of saturated carobxylic acids, esters of acrylic acid and methacrylic acid derived, in each case, from alcohols having 1 to 8 carbon atoms, acrylonitrile, methacvylonitrile, acrylamide or methacrylamide, wherein the total of (a), (b) and (c) in mol % is always 100, and the copolymer has weight average molecular weight Mw of more than 50,000.

* * * * *